(12) United States Patent
Saxena et al.

(10) Patent No.: US 12,568,018 B2
(45) Date of Patent: Mar. 3, 2026

(54) METHOD AND SYSTEM FOR LEGACY NETWORK TRANSFORMATION

(71) Applicant: Infosys Limited, Bangalore (IN)

(72) Inventors: Gaurav Saxena, Mount Laurel, NJ (US); Kishore Babu Thota, Chilakaluripet (IN); Amol Nilkantheshwar Joshi, Pune (IN); Subramaniam Subbiah, Bengaluru (IN); Sreekanth Sreedevi Sasidharan, Moonee Ponds (AU)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 18/378,006

(22) Filed: Oct. 9, 2023

(65) Prior Publication Data

US 2025/0055758 A1 Feb. 13, 2025

(51) Int. Cl.
| | |
|---|---|
| *H04L 41/084* | (2022.01) |
| *H04L 41/0894* | (2022.01) |
| *H04L 41/0896* | (2022.01) |
| *H04L 41/142* | (2022.01) |
| *H04L 41/16* | (2022.01) |

(52) U.S. Cl.
CPC ........ *H04L 41/084* (2013.01); *H04L 41/0894* (2022.05); *H04L 41/0896* (2013.01); *H04L 41/142* (2013.01); *H04L 41/16* (2013.01)

(58) Field of Classification Search
CPC ............... H04L 41/084; H04L 41/0894; H04L 41/0896
See application file for complete search history.

(56) References Cited

U.S. PATENT DOCUMENTS

| | | | | |
|---|---|---|---|---|
| 10,735,891 | B1* | 8/2020 | Trim | H04W 28/20 |
| 10,938,660 | B1* | 3/2021 | Kapur | H04L 41/0895 |
| 2009/0205011 | A1* | 8/2009 | Jain | G06F 8/65 |
| | | | | 726/1 |
| 2016/0381124 | A1* | 12/2016 | Hwang | H04L 43/0817 |
| | | | | 709/226 |
| 2018/0302273 | A1* | 10/2018 | Dome | H04L 41/0816 |
| 2018/0316730 | A1* | 11/2018 | Schaefer | H04L 41/28 |

(Continued)

*Primary Examiner* — Tonia L Dollinger
*Assistant Examiner* — Joseph M Cousins
(74) *Attorney, Agent, or Firm* — Finnegan, Henderson, Farabow, Garrett & Dunner, LLP

(57) ABSTRACT

This disclosure relates to method and system for legacy network transformation. The method includes receiving data corresponding to a legacy WAN from one or more data sources. Further, the method includes analyzing the data to identify one or more transformation requirements for the legacy WAN, based on one of a statistical technique, or a machine learning technique. Further, the method includes determining one or more configuration parameters corresponding to the legacy WAN based on a set of pre-defined business policy rules and the one or more transformation requirements. Further, the method includes generating a high-level design for SD-WAN based on the one or more transformation requirements and the one or more configuration parameters. Further, the method includes generating a low-level design including configuration guidelines templates for the SD-WAN based on the high-level design. Each configuration guidelines template may facilitate the transformation of legacy WAN to the SD-WAN.

17 Claims, 6 Drawing Sheets

(56) References Cited

U.S. PATENT DOCUMENTS

| | | | |
|---|---|---|---|
| 2019/0394087 A1* | 12/2019 | Nadella | H04L 41/0803 |
| 2020/0004582 A1* | 1/2020 | Fornash | G06F 9/4856 |
| 2020/0136949 A1* | 4/2020 | Pant | G06N 3/042 |
| 2021/0226849 A1* | 7/2021 | Malhotra | H04L 41/085 |

* cited by examiner

100

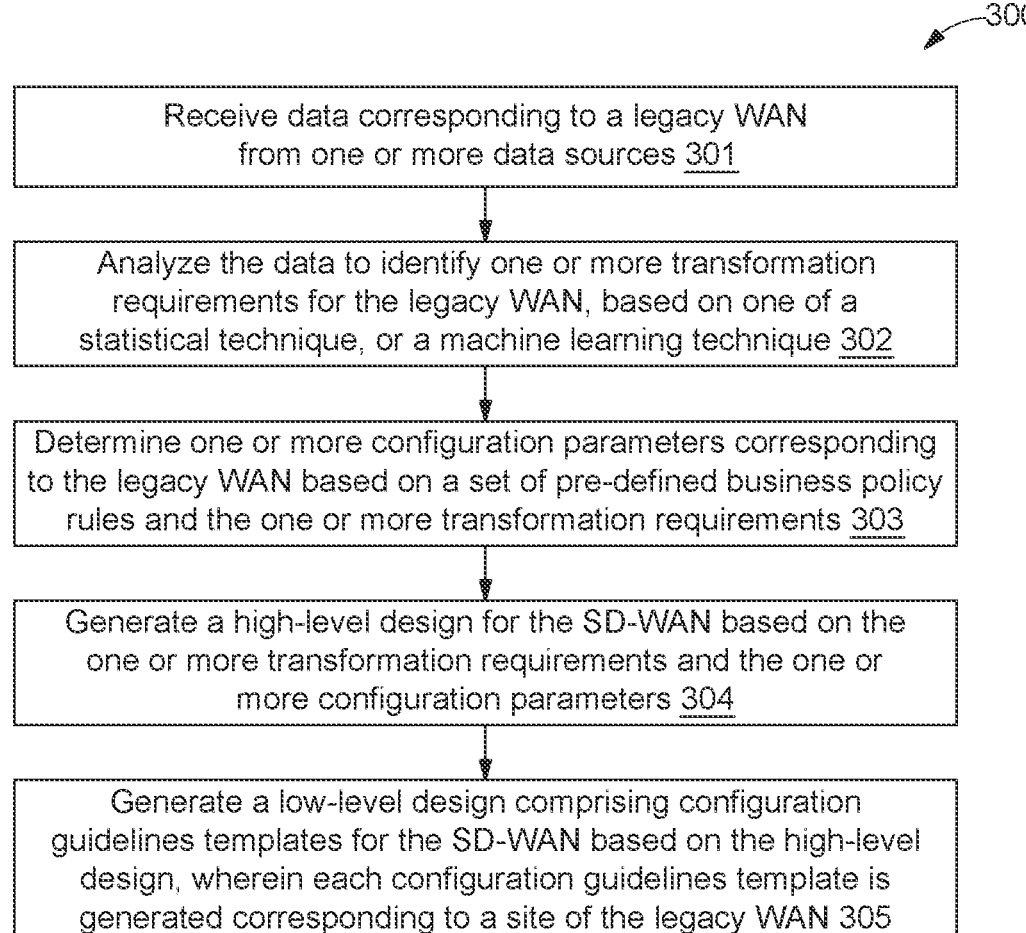

_300_

Receive data corresponding to a legacy WAN
from one or more data sources 301

Analyze the data to identify one or more transformation
requirements for the legacy WAN, based on one of a
statistical technique, or a machine learning technique 302

Determine one or more configuration parameters corresponding
to the legacy WAN based on a set of pre-defined business policy
rules and the one or more transformation requirements 303

Generate a high-level design for the SD-WAN based on the
one or more transformation requirements and the one or
more configuration parameters 304

Generate a low-level design comprising configuration
guidelines templates for the SD-WAN based on the high-level
design, wherein each configuration guidelines template is
generated corresponding to a site of the legacy WAN 305

FIG. 3

METHOD AND SYSTEM FOR LEGACY NETWORK TRANSFORMATION

CROSS-REFERENCE TO RELATED APPLICATION

This application claims priority to Indian Patent Application number 202341054179, filed on Aug. 11, 2023, which is hereby incorporated by reference in its entirety.

TECHNICAL FIELD

This disclosure relates generally to legacy network transformation, and more particularly to a method and a system for transforming a legacy wide area network (WAN) to a software-defined wide area network (SD-WAN).

BACKGROUND

With the emergence of next-generation network technologies like SD-WAN (Software-Defined Wide Area Network) and NFV (Network Functions Virtualization), enterprise network solutions are undergoing radical transformation. Communication Service Providers (CSPs) and System Integrators (SIs) are at the forefront of digital transformation initiatives for their enterprise customers, transitioning them from legacy networks to advanced SD-WAN and NFV technologies.

During the planning and design phase of this transformation, CSPs and SIs encounter significant challenges related to inadequate planning of assets, such as SD-WAN hardware and Virtual Network Functions (VNFs), as well as connectivity and underlay circuits during the creation of the bill of material (BOM). This planning phase is typically customer interview-based and involves manual data collection from various enterprise sites across different geographic locations. As a result, the process becomes error-prone, time-consuming, and cumbersome.

The traditional "plan & design cycles" in this transformation process impact the overall network transformation timelines and may lead to issues during the provisioning and activation phase. Such delays may result in revenue leakage and an increase in capital and operational expenditures (CAPEX/OPEX) for CSPs.

There is, therefore, a need in the present state of art, for techniques to address the challenges faced by CSPs and SIs during the planning and design phase of enterprise network transformations. The proposed techniques significantly reduces planning cycles, minimizes manual errors, and optimizes the overall network transformation process, resulting in improved customer experience and reduced capital and operational costs for CSPs and Sis.

SUMMARY

In one embodiment, a method for legacy WAN transformation is disclosed. In one example, the method may include receiving data corresponding to a legacy WAN from one or more data sources. Further, the method may include analyzing the data to identify one or more transformation requirements for the legacy WAN, based on one of a statistical technique, or a machine learning technique. Further, the method may include determining one or more configuration parameters corresponding to the legacy WAN based on a set of pre-defined business policy rules and the one or more transformation requirements. The one or more configuration parameters may be determined to transform the legacy WAN to a software-defined wide area network (SD-WAN). Further, the method may include generating a high-level design for the SD-WAN based on the one or more transformation requirements and the one or more configuration parameters. Further, the method may include generating a low-level design including configuration guidelines templates for the SD-WAN based on the high-level design. Each configuration guidelines template may be generated corresponding to a site of the legacy WAN, and each configuration guidelines template may facilitate the transformation of legacy WAN to the SD-WAN.

In one embodiment, a system for legacy WAN transformation is disclosed. In one example, the system may include a processor and a computer-readable medium communicatively coupled to the processor. The computer-readable medium may store processor-executable instructions, which, on execution, may cause the processor to receive data corresponding to a legacy WAN from one or more data sources. Further, the processor-executable instructions, on execution, may further cause the processor to analyze the data to identify one or more transformation requirements for the legacy WAN, based on one of a statistical technique, or a machine learning technique. Further, the processor-executable instructions, on execution, may further cause the processor to determine one or more configuration parameters corresponding to the legacy WAN based on a set of pre-defined business policy rules and the one or more transformation requirements. The one or more configuration parameters may be determined to transform the legacy WAN to a software-defined wide area network (SD-WAN). Further, the processor-executable instructions, on execution, may further cause the processor to generate a high-level design for the SD-WAN based on the one or more transformation requirements and the one or more configuration parameters. Further, the processor-executable instructions, on execution, may further cause the processor to generate a low-level design including configuration guidelines templates for the SD-WAN based on the high-level design. Each configuration guidelines template may be generated corresponding to a site of the legacy WAN, and each configuration guidelines template may facilitate the transformation of legacy WAN to the SD-WAN.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

FIG. 3 is a flow diagram of an exemplary process for legacy WAN transformation, in accordance with an exemplary embodiment of the present disclosure;

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
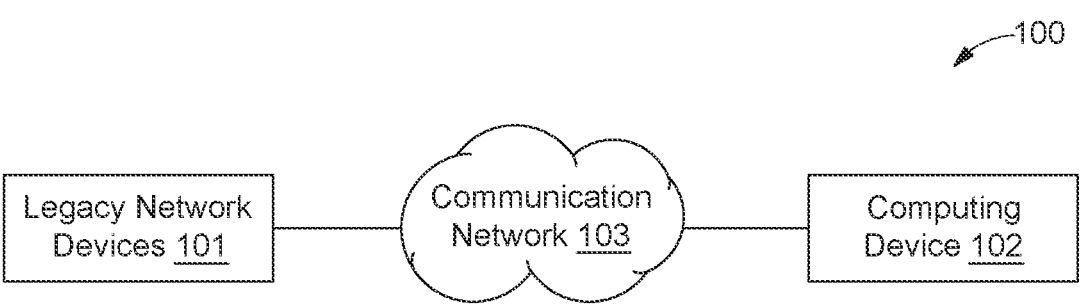
FIG. 1 is a block diagram of an environment for legacy WAN transformation, in accordance with an exemplary embodiment of the present disclosure.

FIG. 1 is a diagram that illustrates an environment 100 for legacy WAN transformation, in accordance with an exemplary embodiment of the present disclosure.

The environment 100 may include one or more data sources (for example, one or more legacy network devices 101), and a computing device 102. The one or more legacy network devices 101 represent existing traditional WAN infrastructure that may include legacy WAN devices, element management systems (EMS) or network management systems (NMS), operations support systems (OSS) or business support systems (BSS), and customer interviews. The communication network 103 may be configured to facilitate communication between the legacy network device 101 and the computing device 102. It may act as a medium through which data may be exchanged between the legacy network devices 101 and the computing device 102 for legacy WAN transformation.

In some embodiments, the communication network 103 may be a private internal network within an organization, where the legacy network devices 101 and the computing device 102 are physically located. Alternatively, the communication network 103 may be a secure connection established over the internet, allowing the legacy network devices 101, which may be located at a remote branch office, to communicate with the computing device 102, which may be located at a central data center of the organization. Examples of the communication network 103 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

As will be described in greater detail in conjunction with FIGS. 2-6, in order to transform the legacy WAN, initially the computing device 102 may receive data corresponding to a legacy WAN from one or more data sources (such as the one or more legacy network devices 101). The data corresponding to the legacy WAN may include crucial information about the existing network, such as network device configurations, historic network performance data, historic event data, network devices logs, LAN and WAN topology, underlay connectivity circuits assets, application types, underlay circuit and virtual local area networks (VLANs) usage historic data, and type of platform for network device deployment.

Once the computing device 102 receives the data, the computing device 102 may perform analysis on this data using statistical techniques or machine learning techniques. The analysis may be performed to identify one or more transformation requirements for the legacy WAN.

In a more elaborative way, the transformation requirements may refer to a specific needs and preferences of a user or enterprise undergoing the legacy WAN transformation. These requirements may include a wide range of factors, such as, but not limited to, security features, bandwidth requirements, geographical considerations, usage patterns of the internet and internal applications, and Quality of Service (QOS) prioritization. These requirements are identified through data analysis using statistical techniques or machine learning techniques and play a crucial role in shaping the design and configuration of a new network (for example, Software-Defined Wide Area Network (SD-WAN)).

The statistical techniques may use mathematical formulas and methods to analyze data, identify trends, and make predictions. The statistical techniques may include, but may not be limited to, descriptive statistics, inferential statistics, regression analysis, correlation analysis, and time series analysis. The machine learning techniques may use algorithms and statistical models that enable the computing device 102 to learn from the data and make data-driven predictions or decisions. Examples of machine learning techniques may include, but may not be limited to, supervised learning techniques, unsupervised learning techniques, and reinforcement learning techniques.

Based on a set of pre-defined business policy rules and the identified transformation requirements, the computing device 102 may further determine one or more configuration parameters needed for the transformation of legacy WAN to the SD-WAN. The one or more configuration parameters may include a protocol overhead, a bandwidth estimation algorithm, a WAN connectivity type, device specifications, sites classifications, and license tiers for each site within the legacy WAN.

With the one or more transformation requirements and configuration parameters in hand, the computing device 102 may generate a high-level design for the SD-WAN. The high-level design may include enterprise network topology, SD-WAN control-plane component design and architecture, WAN routing for underlay circuits, site categorization based on business criticality, redundancy considerations, Quality of Service (QOS) subscription, security requirements, value-added services, bandwidth calendaring, and application profiles.

Subsequently, the computing device 102 may generate a low-level design including configuration guideline templates for the SD-WAN. Each configuration guidelines template may correspond to a site within the legacy WAN, facilitating the transformation of each site to the SD-WAN. These guideline templates may include physical and logical networking resources, WAN routing configurations, traffic policies and prioritization rules, encryption settings, authentication and authorization mechanisms, integration with cloud-based services, high availability and resiliency mechanisms, and configuration guidelines for existing network services and systems integration.

In some embodiments, the computing device 102 may generate vendor-specific SD-WAN configuration templates based on the configuration guidelines templates associated with each site. These vendor-specific templates may be then automatically deployed to an SD-WAN headend orchestrator, and the SD-WAN may be activated based on the deployment.

In some embodiments, the set of pre-defined business policy rules may be dynamically updated to incorporate new configuration parameters specific to additional SD-WAN original equipment manufacturers (OEMs) added to the SD-WAN. This ensures compatibility and adherence to OEM-specific design rules, thereby enabling the ANTS to accommodate future SD-WAN enhancements and advancements.

Figure 2:
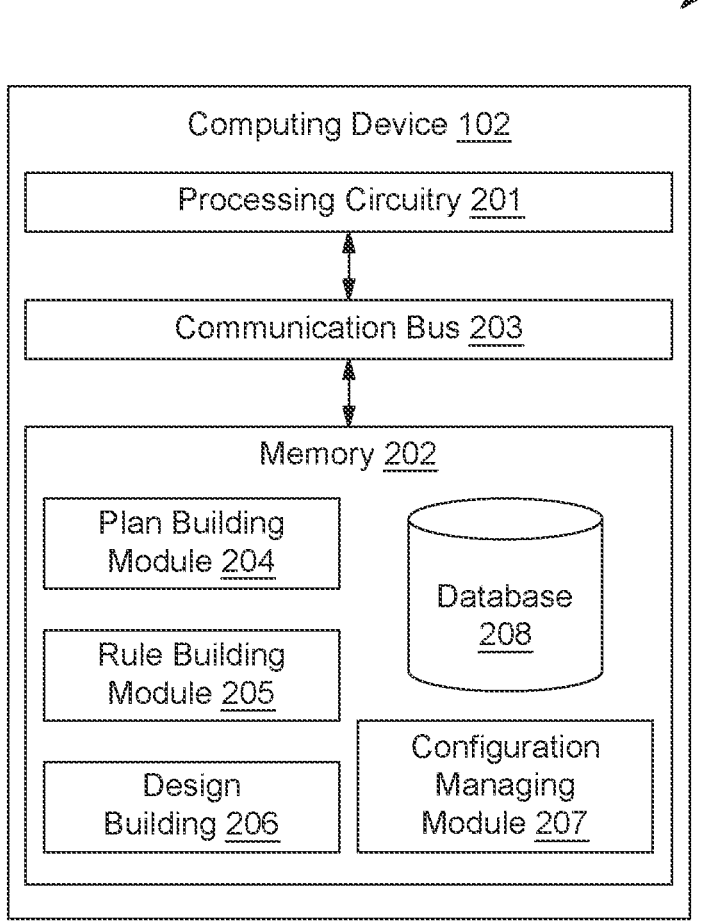
FIG. 2 is a block diagram of a process for legacy WAN transformation, in accordance with an exemplary embodiment of the present disclosure.

FIG. 2 is a diagram that illustrates a process for legacy WAN transformation, in accordance with an exemplary embodiment of the present disclosure. FIG. 2 is explained in conjunction with elements from FIG. 1. The computing device 102 may include a processing circuitry 201 and a memory 202 communicatively coupled to the processing circuitry 201 via a communication bus 203. The memory 202 may store processor instructions. The processor instructions, when executed by the processing circuitry 201, may cause the processing circuitry 201 to implement one or more embodiments of the present disclosure. The memory 202 may include a plan building module 204, a rule building module 205, a design building module 206, a configuration managing module 207, and a database 208.

The plan building module 204 is a necessary component responsible for determining the existing legacy WAN design and architecture of the customer's network. It may gather various network-related information, such as customer type, customer category, network functions, topology, criticality of uptime, type of services, underlay topology, number and types of WAN links, CPE models, LAN IP addressing, site categorization, site topology, branch role, direct internet access, direct cloud access, traffic steering, and network configuration policies.

To further elaborate, the plan building module 204 may be configured to collect data from various data sources, such as legacy WAN devices, EMS or NMS, OSS or BSS, and customer interviews. The collected data includes detailed information about network devices configuration (such as, SD-WAN encapsulation overheads and the presence of local breakout internet links), historic network performance data (such as, device CPU and memory usage patterns), historic alarms or event data, network device logs, LAN and WAN topology through auto discovery (such as, single vs. dual CPE), underlay connectivity circuits assets (such as, multi-WAN), application types (application usage pattern), underlay circuit or VLANs usage historic data (such as, utilization bandwidth sizing), and a type of platform for network device deployment (such as, SaaS/PaaS etc.).

After collecting this vast data, the plan building module 204 may employ statistical analytics or machine learning techniques to perform data analysis in order to identify one or more transformation requirements. In particular, the plan building module 204 may analyze the network's configuration, historic and current data to determine the legacy WAN design and architecture of the customer's network. The goal is to create replica of the legacy WAN design in line with digital twin concept. This digital twin concept based legacy WAN design may act as a reference model to plan and design a SD-WAN effectively.

Based on the analysis, the plan building module 204 may recommend one or more specific requirements to be considered for the SD-WAN design. Additionally, the plan building module 204 may estimate future needs of customer, ensuring that the SD-WAN design may accommodate evolving network demands. These recommendations and estimation may act as valuable inputs to the design building module 206.

The rule building module 205 may be configured to hold a set of predefined business policy rules that may govern the enterprise network transformation. The set of predefined business policy rules cover various decision parameters, such as protocol overhead, bandwidth estimation algorithms, WAN connectivity type (e.g., local vs. central breakout, Broadband vs. Private network), device specifications (e.g., hardware model, VNF, CNF), site classification (e.g., large, mid, small), and license tiers for each site within the legacy WAN.

The rule building module 205 plays a significant role in determining the configuration parameters required to transform the legacy WAN into the SD-WAN. Additionally, the rule building module 205 may dynamically update the set of predefined business policy rules based on changes in business policies or offerings. The set of predefined business policy rules may be updated by incorporating new configuration parameters specific to additional SD-WAN original equipment manufacturers (OEMs) added to the SD-WAN to ensure compatibility and adherence to OEM-specific design rules.

The design building module 206 may be responsible for creating and validating the SD-WAN design and topology for the customer's network transformation from legacy WAN to the SD-WAN. It may utilize the recommendations provided by the plan building module 204 to generate a high-level design (HLD) for the SD-WAN. The HLD includes essential aspects such as the overall enterprise network topology (e.g., hub & spoke, full mesh, partial mesh), SD-WAN control-plane component design and architecture (e.g., centralized vs. distributed), WAN routing for underlay circuits (static, dynamic), site categorization based on business criticality (e.g., Platinum, Gold, Silver, Bronze), redundancy considerations at site and solution levels level (e.g., link level, device level, site level, cloud GW level etc.), Quality of Service (QOS) subscription (e.g., 4-class model, 6-class model, etc.), security requirements (e.g., Stateful FW, NextGen FW, SASE subscription, IDS/IPS, etc.), other value-added services (e.g., local internet breakout, public cloud connectivity, third party Ipsec, etc.), bandwidth calendaring based on traffic pattern analysis, and application profiles for top bandwidth-consuming applications. It should be noted that the design building module 206 may offer an interactive drag-and-drop user interface for easy parameter customization based on the customer's specific business objectives.

The configuration managing module 207 may be configured to generate a low-level design, which includes configuration guideline templates for various SD-WAN solution components. These configuration guideline templates are vendor-agnostic and may be adapted to build vendor specific SD-WAN configuration templates and data model so that it may be automatically pushed into a provisioning system or an SD-WAN headend orchestrator for deployment.

The configuration managing module 207 may ensure seamless integration with the SD-WAN by providing configuration guidelines templates, for example, by identifying a right physical and logical networking resources (e.g., CPE, switches, SD-WAN controllers, etc.) which may act as a foundation for building a Bill of Material (BOM), defining all configuration parameters for WAN routing configurations for different scenarios (e.g., SDWAN-SDWAN branch sites communication, SDWAN to NON-SDWAN branch sites communication, etc.), traffic policies and prioritization rules, traffic classification, QoS configurations, defining traffic encryption settings both over the WAN links and within the SD-WAN infrastructure, defining authentication and authorization mechanisms, firewall rules, and intrusion detection or prevention systems, defining configuration parameters for integration with cloud-based services, WAFs, load balancers, or WAN optimization tools, defining mechanisms for ensuring high availability and resiliency within the SD-WAN deployment (e.g., link-level redundancy, path steering, and active-active or active-passive configurations), and defining configuration guidelines for existing network services, applications or systems that need to integrate with the SD-WAN for seamless integration by configuring interfaces, protocols, and APIs to enable interoperability and seamless data exchange.

The database 208 is an essential component that stores the collected data, transformation requirements, high-level designs, configuration guideline templates, and other relevant information used by the various modules of the computing device 102. It may acts as a repository for historical and real-time data and may provide a centralized location for accessing and managing the data necessary for an efficient and effective legacy WAN transformation process. The database 208 may facilitate seamless communication and data sharing among the different modules, ensuring an integrated approach for legacy WAN transformation.

It should be noted that all such aforementioned modules 204-207 may be represented as a single module or a combination of different modules. Further, as will be appreciated by those skilled in the art, each of the modules 204-207 may reside, in whole or in parts, on one device or multiple devices in communication with each other. In some embodiments, each of the modules 204-207 may be implemented as dedicated hardware circuit comprising custom application-specific integrated circuit (ASIC) or gate arrays, off-the-shelf semiconductors such as logic chips, transistors, or other discrete components. Each of the modules 204-207 may also be implemented in a programmable hardware device such as a field programmable gate array (FPGA), programmable array logic, programmable logic device, and so forth. Alternatively, each of the modules 204-207 may be implemented in software for execution by various types of processors (e.g., the processing circuitry 201). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

FIG. 3 is a diagram that illustrates an exemplary process 300 for facilitating legacy code transformation is depicted via a flowchart, in accordance with an exemplary embodiment of the present disclosure. FIG. 3 is explained in conjunction with elements from FIGS. 1 and 2. In an embodiment, the process 300 may be implemented by the computing device 102. The process 300 may include receiving data corresponding to a legacy WAN from one or more data sources, at step 301.

The one or more data sources may include legacy WAN devices, element management systems (EMS) or network management systems (NMS), operations support systems (OSS) or business support systems (BSS), and customer interviews. The data corresponding to the legacy WAN may include network device configurations, historic network performance data, historic event data, network devices logs, local area network (LAN) and WAN topology, underlay connectivity circuits assets, application types, underlay circuit and virtual local area networks (VLANs) usage historic data, and type of platform for network device deployment.

Further, the process 300 may include analyzing the data to identify one or more transformation requirements for the legacy WAN, based on one of a statistical technique, or a machine learning technique, at step 302.

The process 300 may further include determining one or more configuration parameters corresponding to the legacy WAN based on a set of pre-defined business policy rules and the one or more transformation requirements, at step 303. It should be noted that the one or more configuration parameters may be determined to transform the legacy WAN to a software-defined wide area network (SD-WAN). The one or more configuration parameters may include a protocol overhead, a bandwidth estimation algorithm, a WAN connectivity type, device specifications, sites classifications, and license tiers for each site within the legacy WAN.

In some embodiments, the set of pre-defined business policy rules may be dynamically updated based on updates in business policy. The set of pre-defined business policy rules may be dynamically updated by incorporating new configuration parameters specific to additional SD-WAN original equipment manufacturers (OEMs) added to the SD-WAN to ensure compatibility and adherence to OEM-specific design rules.

Based on the one or more transformation requirements and the one or more configuration parameters, the process 300 may further include generating a high-level design for the SD-WAN, at step 304. The high-level design may include enterprise network topology, SD-WAN control-plane component design and architecture, WAN routing for underlay circuits, site categorization based on business criticality, redundancy considerations, Quality of service (QOS) subscription, security requirements, value-added services, bandwidth calendaring, and application profiles.

Based on the high-level design, the process 300 may further include generating a low-level design that may include configuration guidelines templates for the SD-WAN, at step 305. It should be noted that each configuration guidelines template may be generated corresponding to a site of the legacy WAN. Each configuration guidelines template may include physical and logical networking resources, WAN routing configurations, traffic policies and prioritization rules, encryption settings, authentication and authorization mechanisms, integration with cloud-based services, high availability and resiliency mechanisms, and configuration guidelines for existing network services and systems integration. Each configuration guidelines template may facilitate the transformation of legacy WAN to the SD-WAN.

As will be appreciated by one skilled in the art, a variety of processes may be employed for legacy WAN transformation. For example, the exemplary computing device 102 may transform the legacy WAN to a SD-WAN by the processes discussed herein. In particular, as will be appreciated by those of ordinary skill in the art, control logic and/or automated routines for performing the techniques and steps described herein may be implemented by the computing device 102 either by hardware, software, or combinations of hardware and software. For example, suitable code may be accessed and executed by the one or more processors on the computing device 102 to perform some or all of the techniques described herein. Similarly, application specific integrated circuits (ASICs) configured to perform some, or all of the processes described herein may be included in the one or more processors on the computing device 102.

Figure 4:
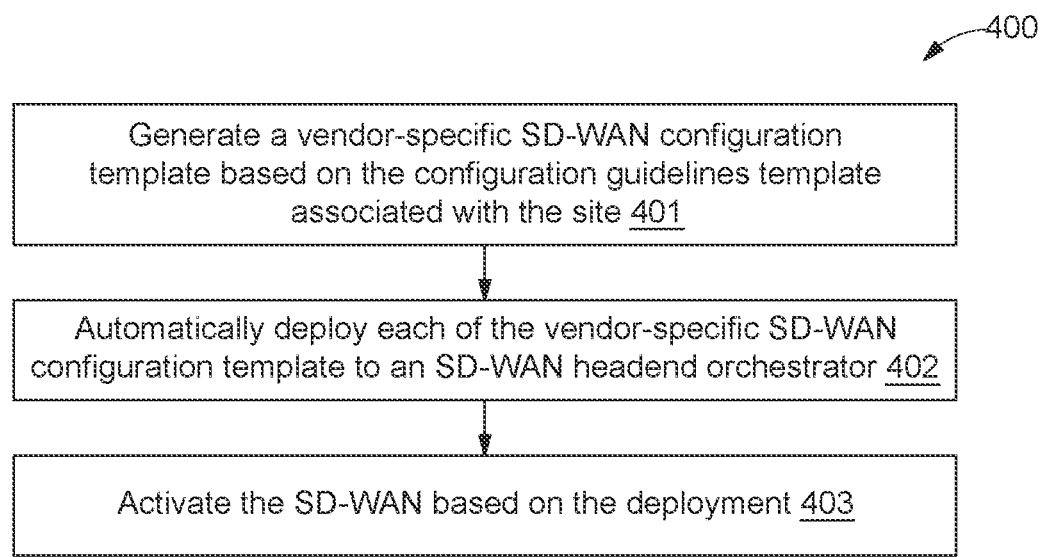
FIG. 4 is a flow diagram of an exemplary process for activating SD-WAN, in accordance with an exemplary embodiment of the present disclosure.

FIG. 4 is a diagram that illustrates an exemplary process 400 for activating SD-WAN is depicted via a flowchart, in accordance with an exemplary embodiment of the present disclosure. FIG. 4 is explained in conjunction with elements from FIGS. 1, 2, and 3. In an embodiment, the process 400 may be implemented by the computing device 102. Once the computing device 102 generates the low-level design for the SD-WAN, at step 305, the process 400 begins with generating a vendor-specific SD-WAN configuration template based on the configuration guidelines template associated with the site, at step 401.

The vendor-specific SD-WAN configuration template ensures that the SD-WAN deployment aligns with the requirements and configurations specific to the selected SD-WAN equipment manufacturer or vendor. By customizing the configuration to suit the specifications of the SD-WAN vendor, the solution ensures compatibility and adherence to the vendor's design rules. This step may be essential in guaranteeing that the SD-WAN solution operates optimally and efficiently, as per the vendor's recommended settings.

Further, the process 400 may include automatically deploying each of the vendor-specific SD-WAN configuration template to an SD-WAN headend orchestrator, at step 402. The SD-WAN headend orchestrator may act as a central management and control point for the SD-WAN network. Upon receiving the vendor-specific SD-WAN configuration template, the orchestrator may efficiently provision and configure the SD-WAN device at each branch site as per the specific design guidelines. This automated deployment modernizes the rollout process, reduces manual intervention, and minimizes the risk of errors, thereby ensuring a consistent and accurate configuration across all SD-WAN branch sites.

Based on deployment, the process 400 may further include activating the SD-WAN, at step 403. During this phase, the SD-WAN may be enabled, and all the configurations and settings specified in the low-level design and the vendor-specific template take effect.

The activation process brings the SD-WAN to existence, allowing it to handle network traffic, optimize data flow, provide enhanced security measures, and efficiently steer traffic between different WAN links. This activation phase marks the successful completion of the SD-WAN transformation.

Figure 5:
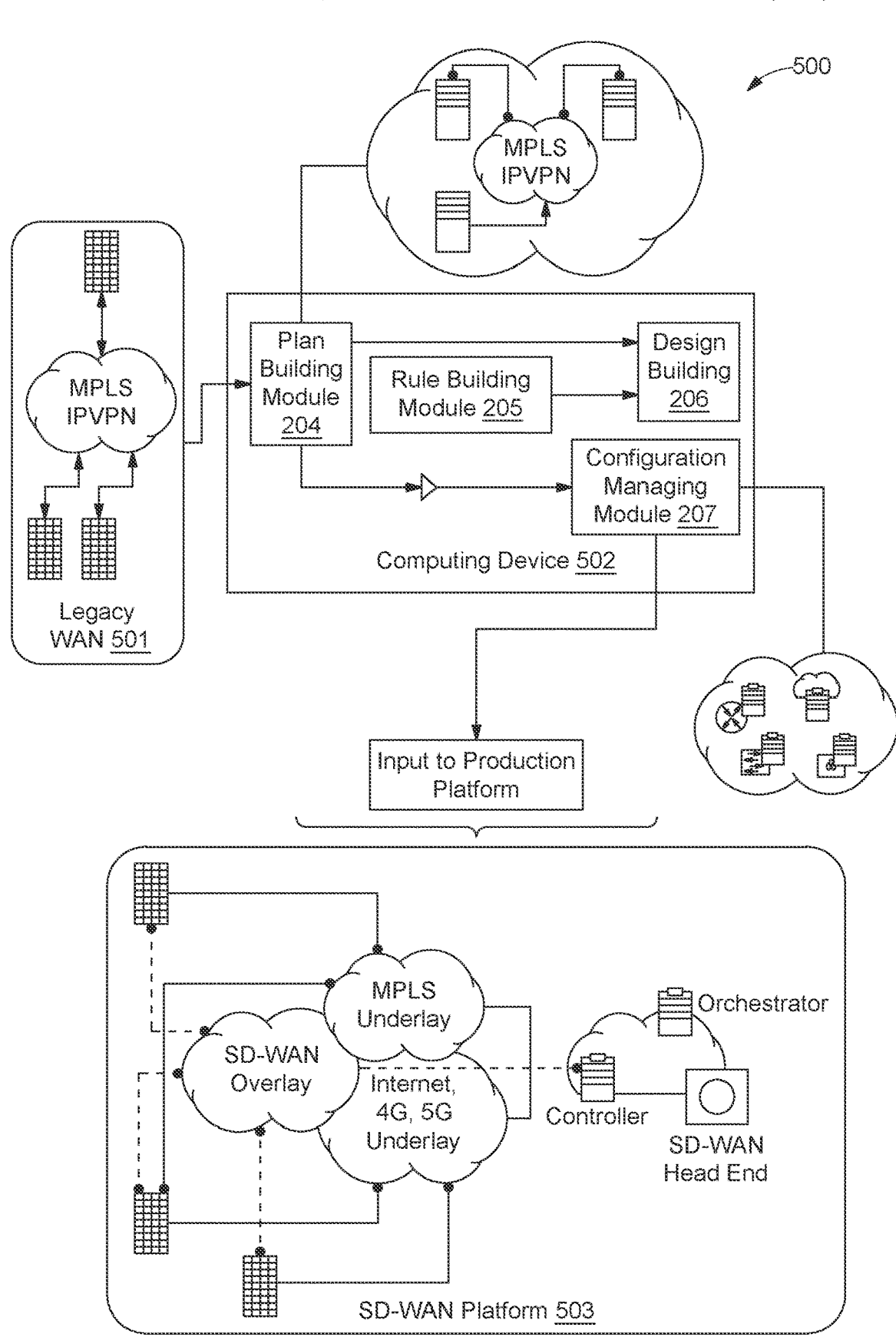
FIG. 5 is a diagram that illustrates transformation of a legacy WAN to a SD-WAN, in accordance with an exemplary embodiment of the present disclosure.

FIG. 5 is a diagram 500 that illustrates transformation of a legacy WAN to a SD-WAN, in accordance with an exemplary embodiment of the present disclosure. FIG. 5 is explained in conjunction with elements from FIGS. 1, 2, 3, and 4. The present FIG. 5 depicts a legacy WAN 501, a computing device 502 (same as the computing device 102), and a SD-WAN platform 503. The legacy WAN 502 may include Multiprotocol Label Switching (MPLS) and Internet Protocol Virtual Private Network (IPVPN) network connections that may be used to establish wide area networks for businesses and organizations. The computing device 502 may include a plan building module 204, a rule building module 205, a design building module 206, and a configuration managing module 207.

The transformation commences with the plan building module 204, which may collect data from the legacy WAN. This data may include details of the existing WAN design, network device configurations, historical performance data, alarms, logs, LAN, and WAN topology, underlay circuits, application usage patterns, and platform types for network device deployment.

Next, the rule building module 205 comes into play. The rule building module 205 may include a set of predefined business policy rules that govern different configuration parameters essential for the transformation process. These predefined business policy rules may include logics to define the different configuration parameters such as protocol overhead (e.g., encapsulation, and encryption), bandwidth estimation algorithms, WAN connectivity types (e.g., local vs. central breakout, Broadband vs. Private network), device specifications (e.g., hardware model, VNF, CNF), site classifications (e.g., large, mid, small), and license tiers for site transformation.

The rule building module 205 may dynamically update these predefined business rules based on changes in business policies or offerings and incorporate new configuration parameters when additional SD-WAN OEMs are added to ensure seamless compatibility.

The design building module 206 may then utilize outputs from the plan building module 204 and the rule building module 205 to generate a high-level design for the SD-WAN. This high-level design may include the overall enterprise network topology, SD-WAN control-plane architecture, WAN routing configurations, site categorizations based on business criticality, redundancy considerations, QoS subscriptions, security requirements, value-added services, bandwidth calendaring, and application profiles. The design building module 206 may provide an interactive user interface for real-time updates and adjustments based on specific business objectives and customer needs.

Further, the configuration managing module 207 may take the high-level design outputs and transforms them into detailed low-level configuration guidelines templates. The configuration guideline templates may include identifies the physical and logical networking resources, configures WAN routing for different scenarios, defines traffic policies and prioritization rules, sets encryption and authentication mechanisms, integrates with cloud-based services, and establishes high availability and resiliency mechanisms. These guidelines enable seamless integration with existing network services and systems, ensuring data exchange and interoperability.

The configuration guideline templates may be vendor-agnostic, ensuring compatibility with various SD-WAN OEMs. In particular, the configuration managing module 207 may generate a vendor-specific SD-WAN configuration template based on the low-level configuration guidelines templates.

With the vendor-specific SD-WAN configuration template, the computing device 502 may effortlessly deploy the validated SD-WAN design to the production platform (e.g., SD-WAN headend orchestrator or SD-WAN platform 503) using North bound Access Point Interfaces (APIs). Once the validated SD-WAN design is deployed into the SD-WAN platform 503, the SD-WAN may be activated at each branch site, integrating the SD-WAN overlay with MPLS underlay, Internet, 4G, or 5G underlay, thereby completing the transformation from legacy WAN to a modern and optimized SD-WAN network. The WAN network is now ready to deliver seamless and optimized communication for enterprise-customer business operations.

For better understanding of legacy WAN transformation, consider an exemplary scenario of an Enterprise Customer-A, who aims to undergo a transformation of their legacy network into an SD-WAN while also establishing new branch sites using either vendor-specific or general-purpose hardware provided by a CSP or SI. The primary objectives for Customer-A are to ensure a smooth migration with minimal disruption, monitor and manage CAPEX and OPEX costs efficiently, and enhance the overall network performance to enable seamless business communications.

To address these challenges, the proposed technique involves a series of well-defined steps. Initially, the first step focus is on identifying the critical data to be collected from the existing network. This includes essential information related to network utilization, configured policies, traffic patterns, bandwidth details, the number of CPE devices, WAN and LAN interfaces per device, direct internet access availability, application usage, and LAN side configurations from the network devices. This data is collected and processed using the plan building module.

Subsequently in second step, business rules are formulated using the rule building module, taking into account the collected data and specific requirements of the transformation. The third step involves the analysis of the data gathered during the initial phase. Statistical methods are employed to interpret the data, and the design building module utilizes the business rules from the rule building module to create a high-level design for the SD-WAN transformation.

Once the high-level design is prepared, it is presented to the Customer-A for review and approval. If the Customer-A accepts the design, the process proceeds to fourth step. At fourth step, the configuration managing module generates the low-level design, including configuration guideline templates for the site that is being migrated. In case the customer requests changes, the third step is repeated until a mutually acceptable high-level design is achieved.

At fifth step, vendor-specific templates tailored to each site's requirements are created for the SD-WAN migration based on the configuration guideline templates generated earlier. Finally, at sixth step the CSP/SI provisions and activates the SD-WAN sites as part of the implementation process. Through this systematic approach, Enterprise Customer-A achieves a successful and efficient transformation of its legacy network to an optimized SD-WAN solution while meeting their specific business objectives.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
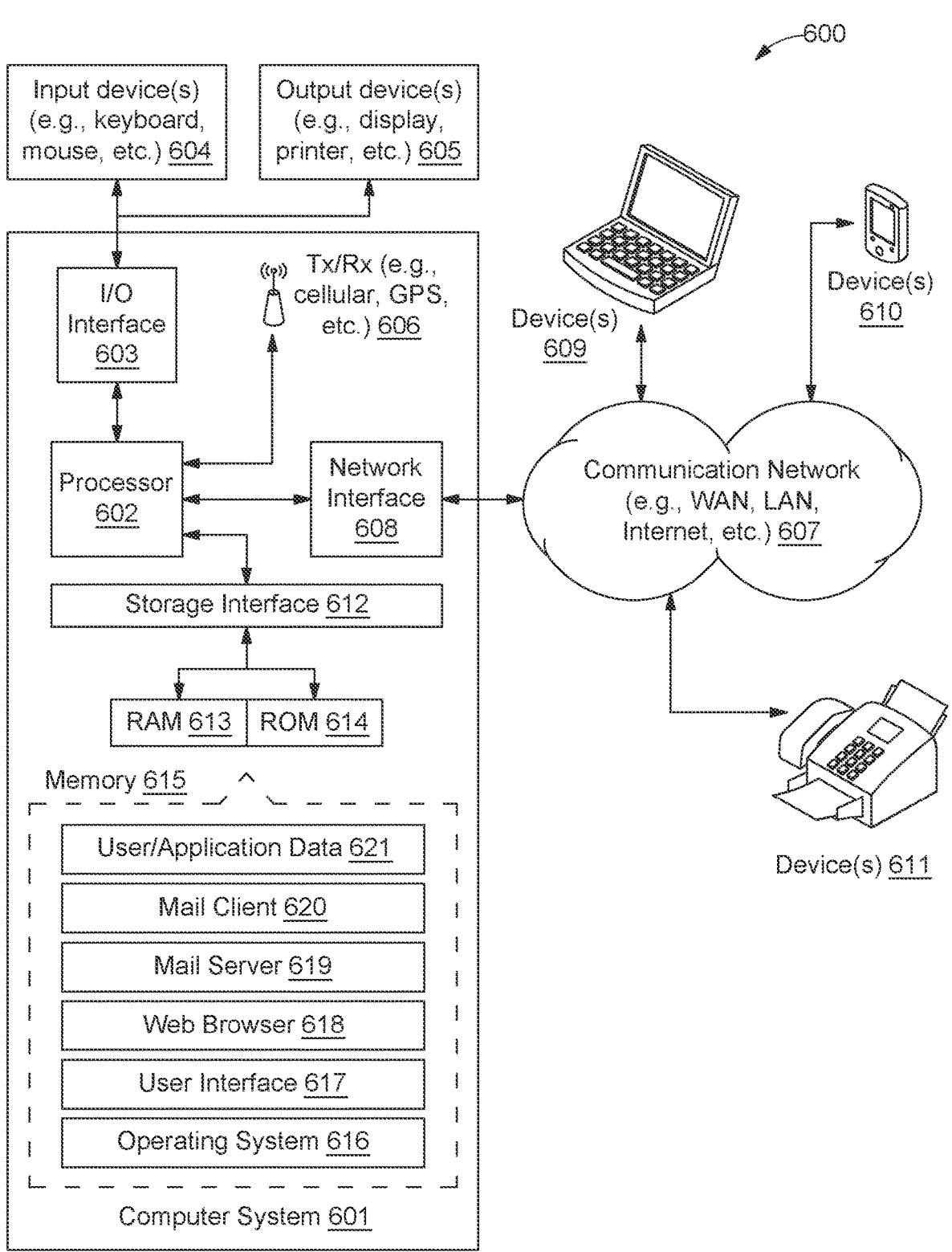
FIG. 6 is a block diagram that illustrates a system architecture of a computer system for legacy WAN transformation, in accordance with an exemplary embodiment of the present disclosure.

The disclosed methods and systems may be implemented on a conventional or a general-purpose computer system, such as a personal computer (PC) or server computer. FIG. 6 is a block diagram that illustrates a system architecture 600 of a computer system 601 for legacy WAN transformation, in accordance with an exemplary embodiment of the present disclosure. Variations of computer system 601 may be used for implementing computing device 102 for legacy WAN transformation. Computer system 601 may include a central processing unit ("CPU" or "processor") 602. Processor 602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORER processor, ITANIUM® processor, XEON® processor, CELERON® processor or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver 606 may facilitate various types of wireless transmission or reception. For example, the transceiver 606 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 802.6a/b/g/n, Bluetooth, FM, global positioning system (GPS), 2G/3G HSDPA/HSUPA communications, etc.

In some embodiments, the processor 602 may be disposed in communication with a communication network 607 via a network interface 608. The network interface 608 may communicate with the communication network 607. The network interface 608 may employ connection protocols including, without limitation, direct connect, Ethernet (e.g., twisted pair 10/100/1000 Base T), transmission control protocol/internet protocol (TCP/IP), token ring, IEEE 802.6a/b/g/n/x, etc. The communication network 607 may include, without limitation, a direct interconnection, local area network (LAN), wide area network (WAN), wireless network (e.g., using Wireless Application Protocol), the Internet, etc. Using the network interface 608 and the communication network 607, the computer system 601 may communicate with devices 605, 609, 610, and 611. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLER, NOOK® etc.), laptop computers, notebooks, gaming consoles (MICROSOFT® XBOX®, NINTENDO® DS®, SONY® PLAYSTATION®, etc.), or the like. In some embodiments, the computer system 601 may itself embody one or more of these devices.

In some embodiments, the processor 602 may be disposed in communication with one or more memory devices 615 (e.g., RAM 613, ROM 614, etc.) via a storage interface 612. The storage interface 612 may connect to memory devices 615 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 615 may store a collection of program or database components, including, without limitation, an operating system 616, user interface 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBMR OS/2, MICROSOFT® WINDOWS® (XP®, Vista R/7/8/10/6, etc.), APPLE® IOS®, GOOGLE® ANDROID®, BLACKBERRY® OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 601 may implement a web browser 618 stored program component. The web browser 618 may be a hypertext viewing application, such as MICROSOFT® INTERNET EXPLORER®, GOOGLE® CHROME®, MOZILLA FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 601 may implement a mail server 619 stored program component. The mail server 619 may be an Internet mail server such as MICROSOFT® EXCHANGE®, or the like. The mail server 619 may utilize facilities such as ASP, ActiveX, ANSI C++/C#, MICROSOFT.NET® CGI scripts, JAVA®, JAVASCRIPT®, PERL®, PHP®, PYTHON®, WebObjects, etc. The mail server 619 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 601 may implement a mail client 620 stored program component. The mail client 620 may be a mail viewing application, such as APPLE MAIL®, MICROSOFT ENTOURAGE®, MICROSOFT OUTLOOK®, MOZILLA THUNDERBIRD®, etc.

In some embodiments, computer system 601 may store user/application data 621, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of legacy network transformation by offering several advantages. to enterprises seeking to transform the legacy WAN to SD-WAN. The disclosed method and system ensure a smooth and seamless migration from the legacy WAN to SD-WAN, minimizing disruptions and avoiding potential downtime during the transition. By identifying design solution gaps before deployment into production, the disclosed method and system helps to prevent potential issues and ensures that the SD-WAN implementation aligns with the enterprise's specific requirements. Further, the disclosed method and system reduces the need for extensive human involvement in SD-WAN site design and data collection, leading to increased efficiency and reduced human error.

By enabling "Right First Time" implementations, the disclosed method and system enhances the customer experience index, providing a reliable and optimized network performance from the outset. Further, the adoption of industry-standard protocols and data models for collecting data from various sources ensures interoperability, scalability, and compatibility with existing network infrastructure. The use of automated planning and configuration management modules significantly reduces the design and provisioning or activation time, enabling rapid deployment and faster time-to-value. Further, the disclosed method and system optimizes network operations, smoothing management tasks and freeing up resources for more strategic activities, thus improving overall operational efficiency. Moreover, by minimizing human intervention, the disclosed method and system contributes to reduced CAPEX and OPEX, providing cost-effective solutions for the enterprise's network transformation needs.

As will be appreciated by those skilled in the art, the techniques described in the various embodiments discussed above are not routine, or conventional, or well understood in the art. The techniques discussed above address the challenges associated with transformation of legacy WAN to SD-WAN. By employing automated planning and design modules guided by predefined business rules, the disclosed techniques ensure a smooth and efficient process. It generates a detailed bill of materials, specifying the hardware models and required ports for each site, facilitating a smooth migration to SD-WAN.

The disclosed techniques creates both high-level and low-level designs for each SD-WAN site, considering the specific requirements and constraints identified during the planning phase. The high-level design encompasses essential aspects such as network topology, control-plane architecture, WAN routing, site categorization, redundancy considerations, QoS subscription, security requirements, and value-added services, among others. On the other hand, the low-level design incorporates vendor-agnostic configuration guideline templates, providing flexibility and compatibility across different SD-WAN solutions. This allows the disclosed techniques to generate specific configurations based on the high-level design outcomes, ensuring consistency and standardization across the entire network.

Moreover, the automated provisioning of SD-WAN sites is seamlessly integrated into the process. The disclosed techniques interact with the SD-WAN vendor solution orchestrator, triggered by the configuration guideline templates, to efficiently provision and activate the SD-WAN at each branch site. This integration minimizes manual intervention and reduces the time and effort required for deployment.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for legacy WAN transformation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for legacy wide area network (WAN) transformation, the method comprising:

receiving, by a computing device, data corresponding to a legacy WAN from one or more data sources;

analyzing, by the computing device, the data to identify one or more transformation requirements for the legacy WAN, based on one of a statistical technique or a machine learning technique, wherein the one or more transformation requirements correspond to a preference of a user;

dynamically updating a set of pre-defined business policy rules by incorporating new configuration parameters specific to additional software-defined wide area network (SD-WAN) original equipment manufacturers (OEMs) added to a software-defined wide area network (SD-WAN);

determining, by the computing device, one or more configuration parameters corresponding to the legacy WAN based on the updated set of pre-defined business policy rules and the one or more transformation requirements, wherein the one or more configuration parameters are determined to transform the legacy WAN to the SD-WAN;

generating, by the computing device, a high-level design for the SD-WAN based on the one or more transformation requirements and the one or more configuration parameters; and upon receiving an approval of the high-level design from the user, generating, by the computing device, a low-level design comprising configuration guidelines templates for the SD-WAN based on the high-level design, wherein each configuration guidelines template is generated corresponding to a site of the legacy WAN, and wherein each configuration guidelines template facilitates the transformation of the legacy WAN to the SD-WAN.

2. The method of claim 1, further comprising generating a vendor-specific SD-WAN configuration template based on the configuration guidelines template associated with the site.

3. The method of claim 2, further comprising:

automatically deploying each of the vendor-specific SD-WAN configuration template to an SD-WAN headend orchestrator; and activating the SD-WAN based on the deployment.

4. The method of claim 1, wherein the data corresponding to the legacy WAN comprises network device configurations, historic network performance data, historic event data, network devices logs, local area network (LAN) and WAN topology, underlay connectivity circuits assets, application types, underlay circuit and virtual local area networks (VLANs) usage historic data, and a type of platform for network device deployment.

5. The method of claim 1, wherein the one or more data sources comprises legacy WAN devices, element management systems (EMS) or network management systems (NMS), operations support systems (OSS) or business support systems (BSS), and customer interviews.

6. The method of claim 1, wherein the one or more configuration parameters comprises a protocol overhead, a bandwidth estimation algorithm, a WAN connectivity type, device specifications, sites classifications, and license tiers for each site within the legacy WAN.

7. The method of claim 1, wherein the high-level design comprises enterprise network topology, SD-WAN control-plane component design and architecture, WAN routing for underlay circuits, site categorization based on business criticality, redundancy considerations, Quality of service (QOS) subscription, security requirements, value-added services, bandwidth calendaring, and application profiles.

8. The method of claim 1, wherein each configuration guidelines template comprises physical and logical networking resources, WAN routing configurations, traffic policies and prioritization rules, encryption settings, authentication and authorization mechanisms, integration with cloud-based services, high availability and resiliency mechanisms, and configuration guidelines for existing network services and systems integration.

9. A system for legacy wide area network (WAN) transformation, the system comprising:

a processing circuitry; and a memory communicatively coupled to the processing circuitry, wherein the memory stores processor instructions, which when executed by the processing circuitry, cause the processing circuitry to:

receive data corresponding to a legacy WAN from a plurality of data sources;

analyze the data to identify one or more transformation requirements for the legacy WAN, based on one of a statistical technique, or a machine learning technique, wherein the one or more transformation requirements correspond to a preference of a user;

dynamically update a set of pre-defined business policy rules by incorporating new configuration parameters specific to additional software-defined wide area network (SD-WAN) original equipment manufacturers (OEMs) added to a software-defined wide area network (SD WAN);

determine one or more configuration parameters corresponding to the legacy WAN based on the updated set of pre-defined business policy rules and the one or more transformation requirements, wherein the one or more configuration parameters are determined to transform the legacy WAN to the SD-WAN;

generate a high-level design for the SD-WAN based on the one or more transformation requirements and the one or more configuration parameters; and upon receiving an approval of the high-level design from the user, generate a low-level design comprising configuration guidelines templates for the SD-WAN based on the high-level design, wherein each configuration guidelines template is generated corresponding to a site of the legacy WAN, and wherein each configuration guidelines template facilitates the transformation of the legacy WAN to the SD-WAN.

10. The system of claim 9, wherein the processor instructions, on execution, further cause the processing circuitry to generate a vendor-specific SD-WAN configuration template based on the configuration guidelines template associated with the site.

11. The system of claim 10, wherein the processor instructions, on execution, further cause the processing circuitry to:

automatically deploy the vendor-specific SD-WAN configuration template to an SD-WAN headend orchestrator; and activate the SD-WAN based on the deployment.

12. The system of claim 9, wherein the data corresponding to the legacy WAN comprises network device configurations, historic network performance data, historic event data, network devices logs, local area network (LAN) and WAN topology, underlay connectivity circuits assets, application types, underlay circuit and virtual local area networks (VLANs) usage historic data, and a type of platform for network device deployment.

13. The system of claim 9, wherein the plurality of data sources comprises legacy WAN devices, element management systems (EMS) or network management systems (NMS), operations support systems (OSS) or business support systems (BSS), and customer interviews.

14. The system of claim 9, wherein the one or more configuration parameters comprises a protocol overhead, a bandwidth estimation algorithm, a WAN connectivity type, device specifications, sites classifications, and license tiers for each site within the legacy WAN.

15. The system of claim 9, wherein the high-level design comprises enterprise network topology, SD-WAN control-plane component design and architecture, WAN routing for underlay circuits, site categorization based on business criticality, redundancy considerations, Quality of service (QOS) subscription, security requirements, value-added services, bandwidth calendaring, and application profiles.

16. The system of claim 9, wherein each configuration guidelines template comprises physical and logical networking resources, WAN routing configurations, traffic policies and prioritization rules, encryption settings, authentication and authorization mechanisms, integration with cloud-based services, high availability and resiliency mechanisms, and configuration guidelines for existing network services and systems integration.

17. A non-transitory computer-readable medium storing instructions that, when executed by at least one processor, cause the at least one processor to perform operations comprising:

receiving, by a computing device, data corresponding to a legacy WAN from one or more data sources;

analyzing, by the computing device, the data to identify one or more transformation requirements for the legacy WAN, based on one of a statistical technique or a machine learning technique, wherein the one or more transformation requirements correspond to a preference of a user;

dynamically updating a set of pre-defined business policy rules by incorporating new configuration parameters specific to additional software-defined wide area network (SD-WAN) original equipment manufacturers (OEMs) added to a software-defined wide area network (SD-WAN);

determining, by the computing device, one or more configuration parameters corresponding to the legacy WAN based on the updated set of pre-defined business policy rules and the one or more transformation requirements, wherein the one or more configuration parameters are determined to transform the legacy WAN to the SD-WAN;

generating, by the computing device, a high-level design for the SD-WAN based on the one or more transformation requirements and the one or more configuration parameters; and upon receiving an approval of the high-level design from the user, generating, by the computing device, a low-level design comprising configuration guidelines templates for the SD-WAN based on the high-level design, wherein each configuration guidelines template is generated corresponding to a site of the legacy WAN, and wherein each configuration guidelines template facilitates the transformation of the legacy WAN to the SD-WAN.

* * * * *